United States Patent
Öman

(10) Patent No.: US 7,251,245 B2
(45) Date of Patent: Jul. 31, 2007

(54) MUTUAL TABLE FOR ENHANCING SOFTWARE AND HARDWARE SWITCHED PACKET FLOW FORWARDING

(75) Inventor: Andreas Öman, Bagarmossen (SE)

(73) Assignee: Packetfront Sweden AB, Hagersten (SE)

( * ) Notice: Subject to any disclaimer, the term of this patent is extended or adjusted under 35 U.S.C. 154(b) by 1056 days.

(21) Appl. No.: 10/314,003

(22) Filed: Dec. 6, 2002

(65) Prior Publication Data

US 2004/0085958 A1    May 6, 2004

(30) Foreign Application Priority Data

Oct. 30, 2002  (SE)  .................................... 0203190

(51) Int. Cl.
*H04L 12/28* (2006.01)
*G06F 15/173* (2006.01)
(52) U.S. Cl. ....................... 370/392; 709/240
(58) Field of Classification Search ............... None
See application file for complete search history.

(56) References Cited

U.S. PATENT DOCUMENTS 5,566,170 A * 10/1996 Bakke et al. ............... 370/392
6,810,427 B1 * 10/2004 Cain et al. .................. 709/238
2003/0198189 A1 * 10/2003 Roberts et al. ............. 370/252

OTHER PUBLICATIONS

H. Jonathan Chao, "Next Generation Routers", Sep. 2002, Proceeding of the IEEE, vol. 90, Issue 9, pp. 1518-1558.*

* cited by examiner

*Primary Examiner*—Rafael Perez-Gutierrez
*Assistant Examiner*—Allahyar Kasraian

(57) ABSTRACT

The invention relates to a router or switch in a broadband network operating through packet flow forwarding. The router provides a CPU switched software flow (12) and a hardware switched accelerated flow (10) in accordance with Hierarchical Flow Forwarding (HEF) by utilizing a mutual flow table (20) partitioned into at least a hardware part (22), an intermediate part (24) and a software part (26) for flow forwarding. The table is examined on a regular basis determined by a time period, and sorted by the ratio of number of packets per time period. It is filled up with the highest ratios in the hardware part (22, 22a), the intermediate ratios in the intermediate part (24, 22a, 26a) and the lowest ratios in the software part (26). Those packet flows that qualified for the intermediate flow (22a, 26a) in a previous examining remain in their memory space if they still qualify for the intermediate part (24). This prevents the exchange between memory spaces (22a, 26a) within the intermediate part of the table relieving the CPU from this workload.

15 Claims, 1 Drawing Sheet

MUTUAL TABLE FOR ENHANCING SOFTWARE AND HARDWARE SWITCHED PACKET FLOW FORWARDING

BACKGROUND OF THE INVENTION

1. Technical Field

The present invention pertains to a router or a switch in a broadband network operating through packet flow forwarding, having a central processor unit (CPU) switched software flow and hardware switched accelerated flow, and a method therefore.

2. Description of the Related Art

A specific type of Access Switching Router (ASR) utilizes an Application Specific Integrated Circuit (ASIC) for packet forwarding in a broadband network, i.e., a hardware solution. The ASIC has limitations in terms of the number of entries in its hardware accelerated forwarding table memory for packet flow. This constitutes a major cause for concern in the design of a broadband router capable of complex network topologies while maintaining wire-speed packet forwarding.

While designing drivers, for example, for a Broadcom 56xx strata-switch forwarding ASIC, all filtering rules were statically inserted in the ASIC. As there were only 1024 rules to utilize, this showed to be a serious limitation, especially when deploying advanced policies and services in the network.

An older version for packet forwarding provided that a router CPU controlled the forwarding through a RAM memory. Such a solution conveys relatively low packet transmission speeds and is not as versatile for the CPU, as the CPU is constantly engaged with other tasks for the router.

A newer generation of routers for flow forwarding introduced hardware accelerated flow forwarding through an ASIC specifically designed for the purpose of flow forwarding in order to discharge the CPU from huge amounts of workload. These ASICS still have to deploy a Content Addressable Memory (CAM) memory with CAM table listings, for example, with as much as 150,000 address entries to other major equipment such as routers, switches, servers, etc. for flow forwarding in the World Wide Web. These memories are very expensive, thus increasing the cost for a router.

The present generation of routers are provided with ASICS, having a small CAM memory which storing capacity is reduced to, for example, 200 addresses. Hence, if there is a lot of traffic only those addresses in the hardware memory would benefit from hardware accelerated flow forwarding and others from CPU software controlled.

In a system with limited hardware accelerated forwarding resources, a complete flow switching cannot be achieved simply because there is not enough space available in the hardware for flow entries. Since hardware acceleration of flows have significant performance advantages to CPU forwarded packets, a lack of hardware resources may lead to performance problems or limit the usability of hardware architectures leading to limited acceleration capabilities.

SUMMARY OF THE INVENTION

The present invention aims to enhance existing hardware flow forwarding by introducing Hierarchical Flow Forwarding (HFF) Switching, which is a working name for the present invention.

In order to achieve its aims and goals the present invention sets forth a router or a switch in a broadband network operating through packet flow forwarding. Thereby it comprises a central processor unit switched software flow and a hardware switched accelerated flow. It further comprises:

hardware means and software means for flow forward switching of packets through a router or switch egress port;

a first memory means for storing a hardware flow forwarding table with limited storing capacity connected to the hardware means;

a second memory means for storing a software flow forwarding table connected to a central processor unit means and operating through a central processor unit related storing capacity;

a mutual table entry listing for the first and second memory means, having a partition of the mutual table in at least a hardware part designation, an intermediate part designation and a software part designation for memory space in the first and second memory means for flow forwarding of entries, whereby the intermediate part designates available first and second memory space in both the memory means in a predetermined assignment of memory space;

means for examining the mutual table on a regular basis determined by a time period, and sorting by the ratio of number of packets per time period, filling up the mutual table with the highest ratios in the hardware part, the intermediate ratios in the intermediate part and the lowest ratios in the software part, and letting those packet flows which qualified for an intermediate flow in a previous examining remain in their memory space if they still qualify for the intermediate part, thus preventing an exchange between memory space designations within the intermediate part of the table relieving the central processor unit from this workload; and means for storing the mutual table entry listings in the first memory means for storing a hardware flow forwarding table and the second memory means for storing a software flow forwarding table, respectively.

In one embodiment the mutual table is provided a lower flush part designating memory space occupations to be removed from the table.

Another embodiment comprises that predetermined specific flows, which always should be hardware accelerated, by system configuration or other reason, are set to match packet header information to be recognized as such.

A further embodiment comprises that each flow entry is checked against a system routing table to determine if a new route to the destination points elsewhere than the route used when the flow entry was created.

Yet another embodiment comprises that if the route to the destination has changed, the flow entry is flushed, ensuring that it is relearned when a next packet in the flow appears, which enables packet filters, reprioritization or similar actions to be handled correctly for a new packet path.

The present invention also sets forth a method for a router or switch in a broadband network operating through packet flow forwarding, having a central processor unit switched software flow and a hardware switched accelerated flow. It comprises the steps of:

providing hardware means and software means for flow forward switching of packets through a router or switch egress port;

providing a first memory means for storing a hardware flow forwarding table with limited storing capacity connected to the hardware means;

providing a second memory means for storing a software flow forwarding table connected to a central processor unit means and operating through a central processor unit related storing capacity;

providing a mutual table entry listing for the first and second memory means, having a partition of the mutual table in at least a hardware part designation, an intermediate part designation and a software part designation for memory space in the memory means for flow forwarding of entries, whereby the intermediate part designates available memory space in both the first and second memory means in a predetermined assignment of memory space;

examining the mutual table on a regular basis determined by a time period, and sorting by the ratio of number of packets per time period, filling up the mutual table with the highest ratios in the hardware part, the intermediate ratios in the intermediate part and the lowest ratios in the software part, and letting those packet flows which qualified for an intermediate flow in a previous examining remain in their memory space if they still qualify for the intermediate part, thus preventing an exchange between memory space designations within the intermediate part of the table relieving the central processor unit from this workload; and storing the mutual table entry listings in the first memory means for storing a hardware flow forwarding table and the second memory means for storing a software flow forwarding table, respectively.

Other embodiments of the method of the present invention are set out in the attached dependent method claims, which correspond to the described router or switch embodiments.

BRIEF DESCRIPTION OF THE DRAWINGS

Henceforth, in the following description reference is had to the accompanying drawings for a better understanding of the present invention with its given examples and embodiments, wherein.

DETAILED DESCRIPTION OF THE PREFERRED EMBODIMENTS

Figure 1:
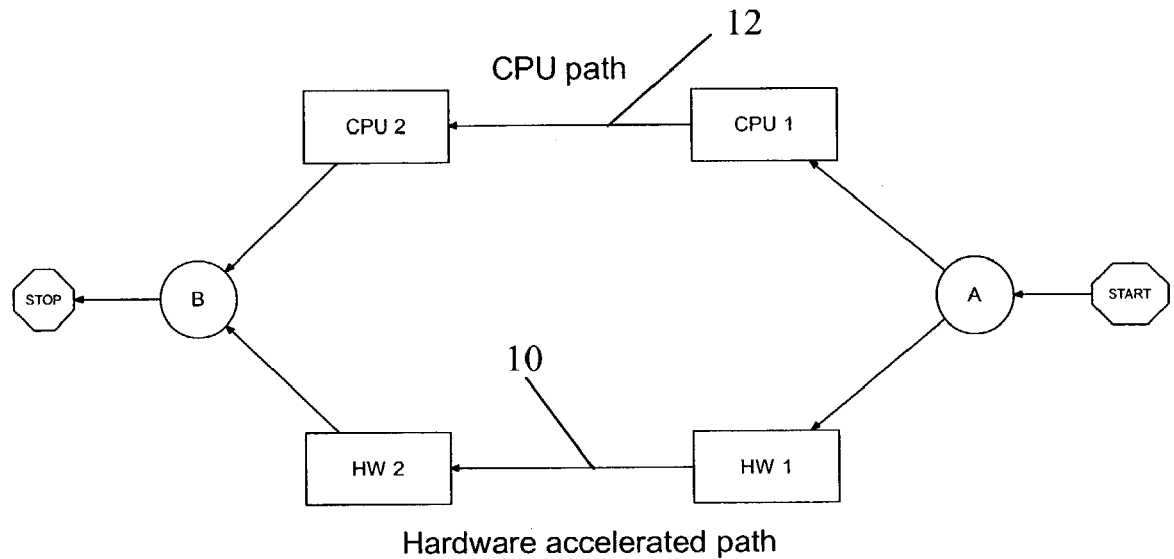
FIG. 1 is schematically illustrating a flow forwarding hardware path and CPU software path in accordance with the present invention.

To be able to more readily understand the Hierarchical Flow Forwarding (HFF) Switching concept of the present invention it is necessary to understand the basics of flow switching.

In TCP/IP communication, a communication takes place in flows. A flow is a sequence of related packets streaming through a network in one direction between two communicating hosts. The expression "related" is a keyword, i.e., transmitted packets relate to one another.

The most common form of communication with IP is utilizing the Open Systems Interconnection (OSI) transport layer protocols User Datagram Protocol (UDP) or Transmission Control Protocol (TCP). Both of these protocols contain unique identifiers, known as port numbers, which identify communication software in each of two communicating hosts. Together with source and destination IP address and protocol number found in the IP header and the source and destination port in the UDP or TCP header a unique tuple (set) of identifiers for any particular communication between two hosts is found. Even if the two hosts have two simultaneous communications with the same protocol, at least the source or destination port differs.

This information can be used to program forwarding hardware such as an ASIC, or a CAM table used by ASICs or network processors to perform packet forwarding. The basic idea is that whenever a packet enters, it is checked if a flow entry, consisting of five tuples, exists for the packet, and if so the hardware is enabled to forward the packet without processing it in the CPU. If a flow entry does not exist, the packet is forwarded to the CPU for further analysis. In one embodiment of the present invention the five tuples are IP src (source) port, IP dst (destination) port, type of protocol such as TCP, UDP, ICMP etc., protocol src port and protocol dst port.

An analysis may consist of the collection of accounting information, for billing and/or statistics purposes, determining permissions, firewall filters and packet inspection, reclassification of the packet type, prioritization of packet and other operations. Once the CPU has decided how the packet should be treated it may or may not reprogram forwarding hardware to accept the packet. In more powerful systems this may include other automated actions by the hardware on subsequent packets in the flow.

An important result is that in most cases only the first packet in any sequence of packets belonging to the same flow has to be inspected by the CPU. All other packets are handled by the hardware thus saving valuable processing cycles in the CPU for other tasks. The result is not only wire-speed qualities on accounting, filtering and forwarding but also that even less capable hardware solutions are capable for high speed communication.

In a system with limited hardware accelerated forwarding resources a complete flow switching cannot be achieved, simply because there is not enough space available in the hardware for flow entries. Since hardware acceleration of flows has significant performance advantages to CPU forwarded packets, a lack of hardware resources may lead to performance problems or limit the usability of hardware architectures due to limited acceleration capabilities.

For a system to operate efficiently in a network environment the most active flows, flows with the largest amount of traffic, should be prioritised into the hardware, while other flows of lesser traffic volume or importance, such as lower prioritised flows, should be handled by the CPU.

A basic concept in HFF in accordance with the present invention is to have the CPU forward all packets and use the hardware as an accelerator.

The solution to the problem of wire-speed forwarding in routers with limited hardware forwarding entries in switching ASICs in accordance with the present invention is an adapted version of the classic IPv4 five-tuple multi-layer flow switching algorithm, herein named Hierarchical Flow Forwarding (HFF) Switching.

FIG. 1 is schematically illustrating a flow forwarding hardware path 10 and CPU software path 12 in a router or switch in accordance with the present invention. As depicted in FIG. 1 a packet (P) enters the system at START. The packet P is received by the hardware and reaches a decision point A. At point A, a hardware forwarding table is consulted, not shown, for the flow entry of P. If no entry exists, the packet is default forwarded to CPU1. At CPU1 a software flow cache, not shown, is consulted to determine if the packet is part of a CPU switched flow. If a flow entry exists, the packet is forwarded to CPU2. If no software flow entry for the packet exists, then the packet is determined as the first packet of a new flow. The packet P must be matched against any configured filters or other policies to determine if the packet should be forwarded. If the packet is to be forwarded an appropriate software flow entry is created before forwarding the packet to CPU2. Otherwise the packet is discarded.

At CPU2 the packet P is prepared for an egress (exit) queue. Any appropriate header manipulation is performed and the packet is queued on the egress port. Packet counters for the flow in the flow table are incremented. If, to the contrary, a hardware forwarding entry in the table exist, the packet is forwarded to hardware 1 (HW 1). At HW 1 the packet may be affected by any hardware features such as filtering, prioritization, recoloring, routing table/CAM, table lookup, header manipulation or other activities before forwarding to hardware 2 (HW 2). At HW 2 the packet is analyzed for a flow counter update in the hardware flow table before the packet is queued on the egress port. Packet counters for the flow in the flow table are incremented.

Recoloring resembles prioritising and is a technical term for the changing of priority values for packets.

At node B the hardware runs the egress queues of ports and transmits any waiting packets. The sequence of actions such as rate-limiting, packet filtering, accounting, re-colouring, prioritization, etc. may depend on the hardware architecture used, but that does not alter the basic principle of the algorithm which is to allow flows to move between the hardware and software flow cache depending on the current traffic rate of the flow.

A router or switch in a broadband network in accordance with the present invention is provided a CPU switched software flow 12 and a hardware switched accelerated flow 10. It comprises hardware means and software means for flow forward switching of packets through the router's egress port. The hardware means has a connected memory means for storing a hardware flow forwarding table with limited storing capacity. A memory means for storing a software flow forwarding table is connected to the CPU means.

Figure 2:
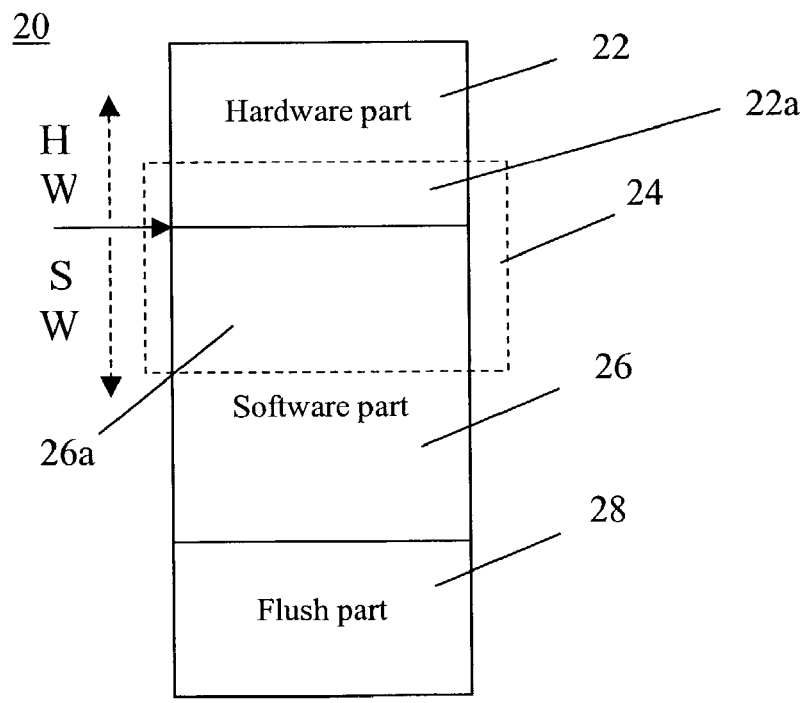
FIG. 2 is schematically illustrating a flow-forwarding table partitioned in accordance with the present invention.

Now, with reference to FIG. 2, which schematically illustrates, a mutual flow forwarding table 20, or flow cache, is partitioned in accordance with the present invention. In this embodiment of the present invention a flow table 20 as in FIG. 2 is maintained, which keeps track of flow entries both for hardware and software. The upper part of the table is designated for hardware flow paths 10 through the hardware flow table part 22. This part is followed by a software flow table part 26 and a flush zone part 28.

In accordance with the present invention an intermediate part 24, indicated by the broken line rectangle in FIG. 2, of the table 20 is created. This intermediate part 24 is overlapping both the hardware part 22 and the software part 26 of the table 20. The overlapped hardware part 22a designates hardware memory entries for flow forwarding, and the overlapped software part 26a designates software memory entries for flow forwarding. As can be seen from FIG. 2, the introduction of the intermediate part 24 has a mutual part 22a and 26a with respect to hardware and software flow forwarding memory space designation.

The flush part 28 is utilized to remove entries, which do not present any ongoing traffic. If entries in the flush part 28 were not removed, the flow table 20 would grow infinitely as the number of possible flow combinations is all possible IP addresses to all billions of possible port number combinations for all possible protocols. Hence, the memory space available is not sufficient enough and stored flows that have not presented any traffic for a period have to be flushed out of the table so that they do not allocate the entire memory.

As the present invention is utilized in systems with limited hardware resources the hardware flow table part 22 and 22a is no larger than enabled by available hardware, while the software flow table part 26 and 26a may be many times as large, only limited by the performance of the system of a used router or switch.

The table 20 designates CPU controlled memory space 28, 26 and 26a (such as RAM) memory from the bottom of the table to the unbroken line arrow pointing on the border between hardware and software designating memory space, which lies within the intermediate part 24 dividing the intermediate part 24 into two memory designating parts 22a and 26a of different type, one part 26a designating software memory space and another part 22a designating hardware memory space. FIG. 2 also indicates the direction of hardware memory designating space 22 with a broken line arrow pointing upwards and letters HW, and a broken line arrow pointing downwards and letters SW for software designating space 26 in FIG. 2 for the table 20.

Hardware designated memory space 22 and 22a can be, for example, a CAM type memory, and software designating space 26 and 26a can be, a RAM type memory.

It is appreciated that the intermediate part 24 should be designed so that a router performs the best depending on the traffic situation for flow forwarding, whereby the percentage between hardware and software designated memory space 22a and 26a within the intermediate part can differ from application to application.

For example, if a hardware acceleration memory table for instance, an ASIC for flow forwarding, can keep 200 entries, the entire flow table memory might be 5,000 entries large. The size of the intermediate part 24 as well as the size of the flush part 28 are both depending on the actual state of the system of the router. In order to maximize the performance, the hardware designating flow table 22 and 22a should contain the most active flows thus moving the most intense packet forwarding to hardware HW 1 and HW 2. This is achieved by examining the existing mutual flow-table 20 at regular intervals, for example, once per second or another suitable time period, and sorting the table 20 based on the number of packets per second, or other time period, determined in each flow.

The present invention applies means for examining the mutual table 20 on a regular basis determined by a time period. A sorting by the ratio of number of packets per time period is accomplished and the table 20 is filled up with the highest ratios in the hardware part 22 and 22a. As is apparent from FIG. 2, a part of the intermediate ratios in the intermediate part 24 are also designated hardware memory space, another part of the intermediate part are designated software memory space 26a and the lowest ratios are designated software memory space 26 beneath the software part 26a in the intermediate part 24.

Packet flows which qualified for the intermediate part 24 flow in a previous examining in accordance with the present invention remain in their designated memory space if they still qualify for the intermediate part 24, which prevents an exchange between memory space designations 22a and 26a within the intermediate part 24 of the table 20, thus relieving the Cpu from this workload. This means, i.e., that there will be memory space designations for packet forwarding in the software designating part 26a, in the intermediate part 24, which have a higher ratio for packet forwarding than those designated to hardware memory space 22a, but as they still qualify as intermediate ratios they will remain in the software designating memory part 26*a*. This approach of the present invention relieves the CPU in a router or switch from the workload of having to move packet flow designations between memory designating space 22*a* and 26*a* in the intermediate part 24 of the table 20.

After an examining of the table, the mutual table 20 entry listings are stored in the memory means for storing a hardware flow forwarding table such as CAM and the memory means for storing a software flow forwarding table such as RAM, respectively, by means for storing those.

Hence, the most active flows are sorted at the top of the table 20 while the least active flows will be sorted at the bottom of the table. Those entries in the sorted table that fill slots/space available for the hardware flow part of table 22 will be installed into hardware. Flows matching slots designated as intermediate part 24 flows are not changed. If they are in the hardware part 22*a*, they remain in hardware. If they are in the software part 26*a* they remain in software. This minimizes flapping/exchange of entries being moved back and forth between hardware and software paths in accordance with FIG. 1.

Flows below the intermediate part are installed into a software flow part of the table 20 and finally, the bottom entries residing in the flush part 28 will be removed from the router. These entries represent flows with no activity.

If specific flows always should be hardware accelerated, by system configuration or other reason, the control header information is matched for recognition as accelerated. The establishment of a permanent hardware flow for specific packet flows involves defining the fields, e.g. binary or hexadecimal, in the packet header that should be matched for a permanent flow establishment. The fields utilized could, e.g. be protocol source/destination addresses, specific protocol flags, etc.

Each flow entry is also checked against the system routing table to determine if a new route to the destination points elsewhere than the route used when the flow entry was created. If the route to the destination has changed, the flow entry is flushed to ensure that it is relearned when the next packet in the flow appears. This allows for any packet filters, reprioritization or similar actions to be handled correctly for the new packet path.

It is appreciated that means mentioned throughout the present description, if not specifically named, either are software means, hardware means or a combination of them.

Further embodiments of the present invention will be apparent from the attached set of claims.

The invention claimed is:

1. A router or switch in a broadband network operating through packet flow forwarding, having a central processor unit switched software flow and a hardware switched accelerated flow, characterized by comprising:
   hardware means and software means for flow forward switching of packets through a router egress port;
   a first memory means for storing a hardware flow forwarding table with limited storing capacity connected to said hardware means;
   a second memory means for storing a software flow forwarding table connected to a central processor unit means and operating through a central processor unit related storing capacity;
   a mutual table entry listing for said first and second memory means, having a partition of the mutual table in at least a hardware part designation, an intermediate part designation and a software part designation for memory space in said first and second memory means for flow forwarding of entries, whereby the intermediate part, designates available memory space in both said first and second memory means in a predetermined assignment of memory space;
   means for examining said mutual table on a regular basis determined by a time period, and sorting by the ratio of number of packets per said time period, filling up said mutual table with the highest ratios in the hardware part, the intermediate ratios in the intermediate part and the lowest ratios in the software part, and letting those packet flows which qualified for an intermediate flow in a previous examining remain in their memory space if they still qualify for the intermediate part, thus preventing an exchange between memory space designations within the intermediate part of the intermediate ratios in the intermediate part and the lowest ratios in the software part, and letting those packet flows which qualified for an intermediate flow in a previous examining remain in their memory space if they still qualify for the intermediate part, thus preventing exchange between memory space designations within the intermediate part of the table relieving the central processor unit from workload; and
   means for storing said mutual table entry listings in said first memory means for storing a hardware flow forwarding table and said second memory means for storing a software flow forwarding table, respectively.

2. A router or switch according to claim 1, characterized in that said mutual table is provided a lower flush part designating memory space occupations to be removed from table.

3. A router according to claim 2, characterized in that each flow entry is checked against a system routing table to determine if a new route to the destination points elsewhere then the route used when the flow entry was created.

4. A router or switch according to claim 1, characterized in that predetermined specific flows which always should be hardware accelerated, by system configuration or other reason, are set to match packet header information to be recognized as such.

5. A router according to claim 4, characterized in that each flow entry is checked against a system routing table to determine if a new route to the destination points elsewhere than the route used when the flow entry was created.

6. A router or switch according to claim 1, characterized in that each flow entry is checked against a system routing table to determine if a new route to the destination points elsewhere than the route used when the flow entry was created.

7. A router according to claim 6, characterized in that if the route to the destination has changed, the flow entry is flushed, ensuring that it is relearned when a next packet in the flow appears, which enables packet filters, reprioritization or similar actions to be handled correctly for a new packet path.

8. A method or switch for a router in a broadband network operating through packet flow forwarding, having a central processor unit switched software flow and a hardware switched accelerated flow, characterized by comprising the steps of:
   providing hardware means and software means for flow forward switching of packets through a router egress port;
   providing a first memory means for storing a hardware flow forwarding table with limited storing capacity connected to said hardware means;
   providing a second memory means for storing a software flow forwarding table connected to a central processor unit means and operating, through a central processor unit related storing capacity;

providing a mutual table entry listing for said first and second memory means, having a partition of the mutual table in at least a hardware part designation, an intermediate part designation and a software part designation for memory space in said first and second means for flow forwarding of entries, whereby the intermediate part designates available memory space in both said first and second memory means in a predetermined assignment or memory space;

examining said mutual table on a regular basis determined by a time period, and sorting by the ratio number of packets per said time period, filling up said mutual table with the highest ratios in the hardware part, the intermediate ratios in the intermediate part and the lowest ratios in the software part, and letting those packet flows which qualified for an intermediate flow in a previous examining remain in their memory space if they still qualify for the intermediate part, thus preventing an exchange between memory space designations within the intermediate part of the table relieving the central processor unit workload; and storing first said mutual table entry listings in said memory means for storing a hardware flow forwarding table and said second memory means for storing a software flow forwarding table, respectively.

9. A method, for a router according to claim 8, characterized in that said mutual table is provided a lower flush part designating memory space occupations to be removed from table.

10. A method for a router according to claim 9, characterized in that predetermined specific flows which always should be hardware accelerated, by system configuration or other reason, are set to match packet header information to be recognized as such.

11. A method for a router according to claim 9, characterized in that each flow entry is checked against a system routing table to determine if a new route to the destination points elsewhere than the route used when the flow entry was created.

12. A method for a router according to claim 8, characterized in that predetermined specific flows which always should be hardware accelerated, by system configuration or other reason, are set to match packet header information to be recognized as such.

13. A method for a router according to claim 12, characterized in that each flow entry is checked against a system routing table to determine if a new route to the destination points elsewhere than the route used when the flow entry was created.

14. A method for a router according to claim 8, characterized in that each flow entry is checked against a system routing table to determine if a new route to the destination points elsewhere than the route used when the flow entry was created.

15. A method for a router according to claim 14, characterized in that if the route to the destination has changed, the flow entry is flushed, ensuring that it is relearned when a next packet in the flow appears, which enables packet filters reprioritization or similar actions to he handled correctly for a new packet path.

* * * * *